Figure 10:
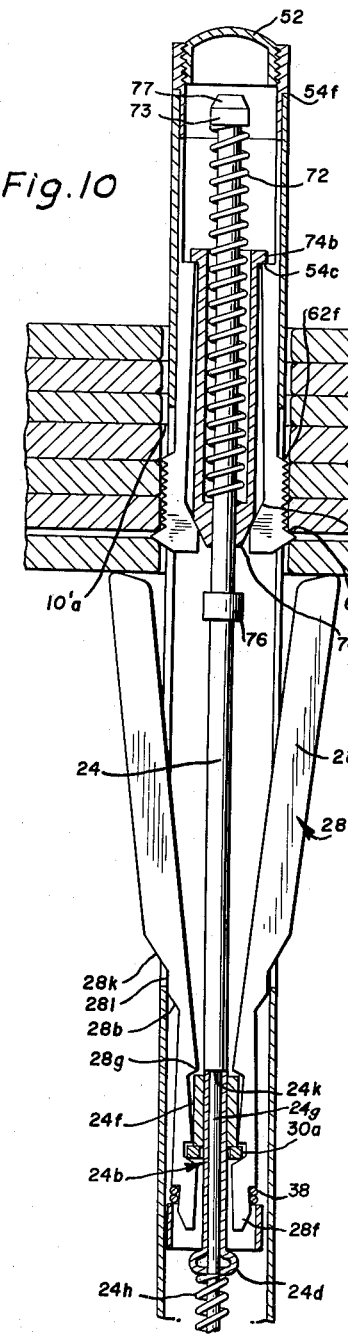

April 25, 1961  H. C. HANSEN  2,981,953
MAGAZINE PHONOGRAPHS
Filed March 5, 1957  10 Sheets-Sheet 1
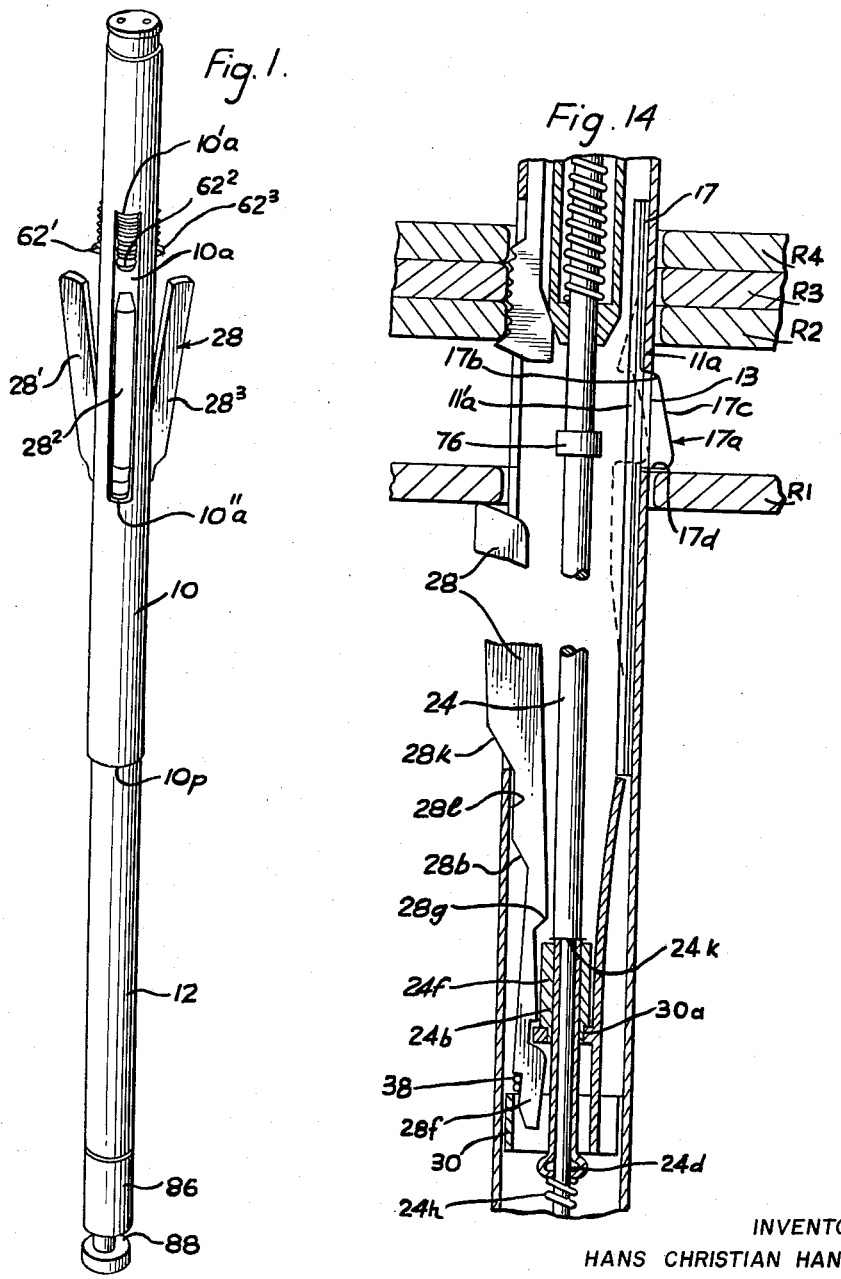
INVENTOR
HANS CHRISTIAN HANSEN
BY
Dicke, Craig & Freudenberg
ATTORNEYS April 25, 1961 H. C. HANSEN 2,981,953
MAGAZINE PHONOGRAPHS
Filed March 5, 1957 10 Sheets-Sheet 2
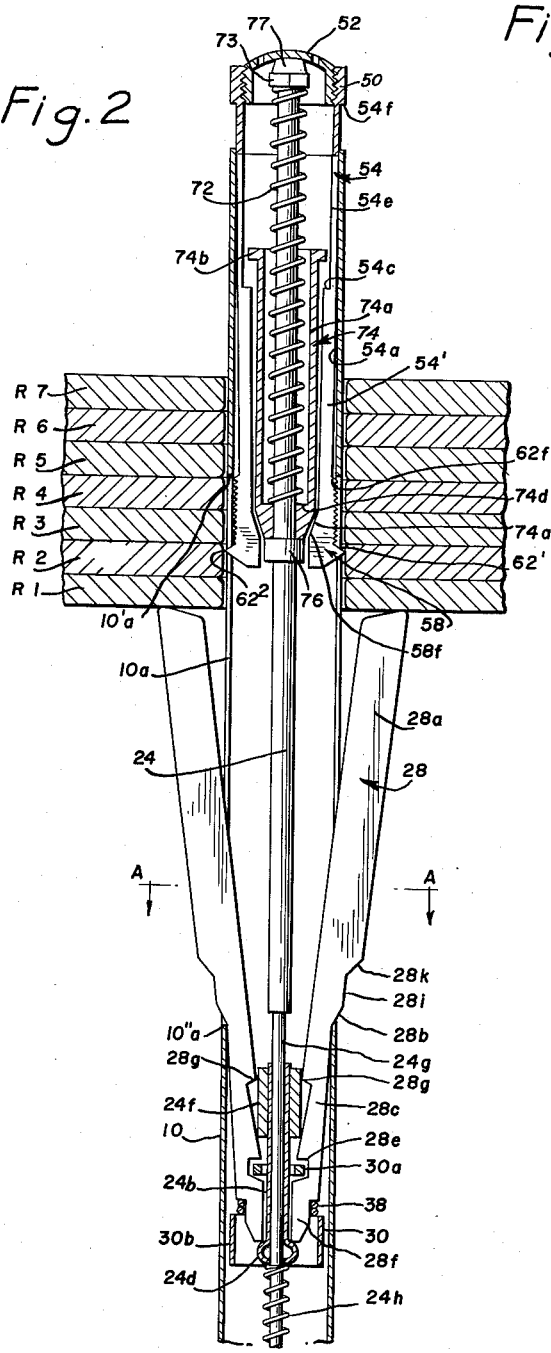
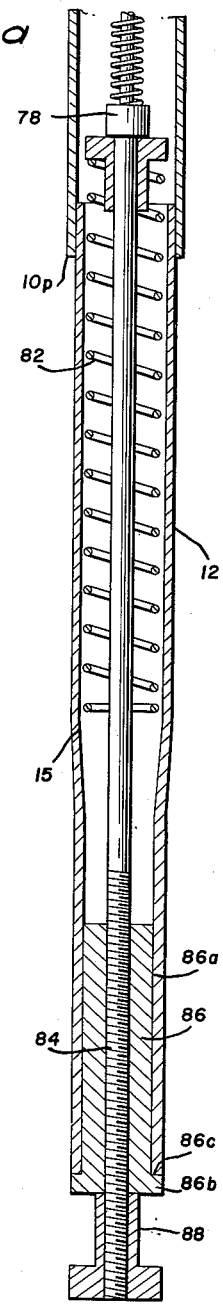
INVENTOR.
HANS CHRISTIAN HANSEN
BY
Dicke, Craig & Freudenberg
ATTORNEYS

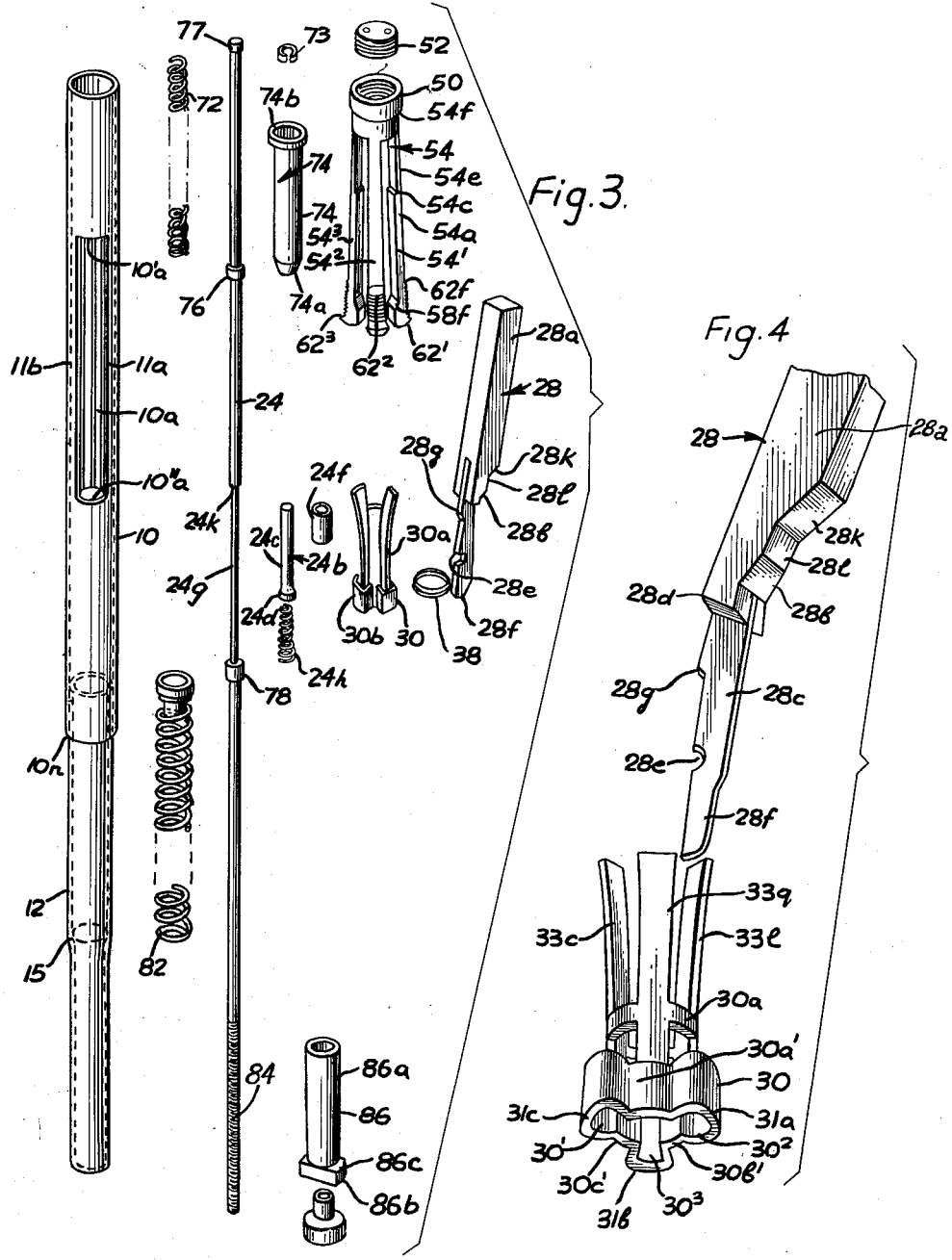

April 25, 1961 H. C. HANSEN 2,981,953
MAGAZINE PHONOGRAPHS
Filed March 5, 1957 10 Sheets-Sheet 4
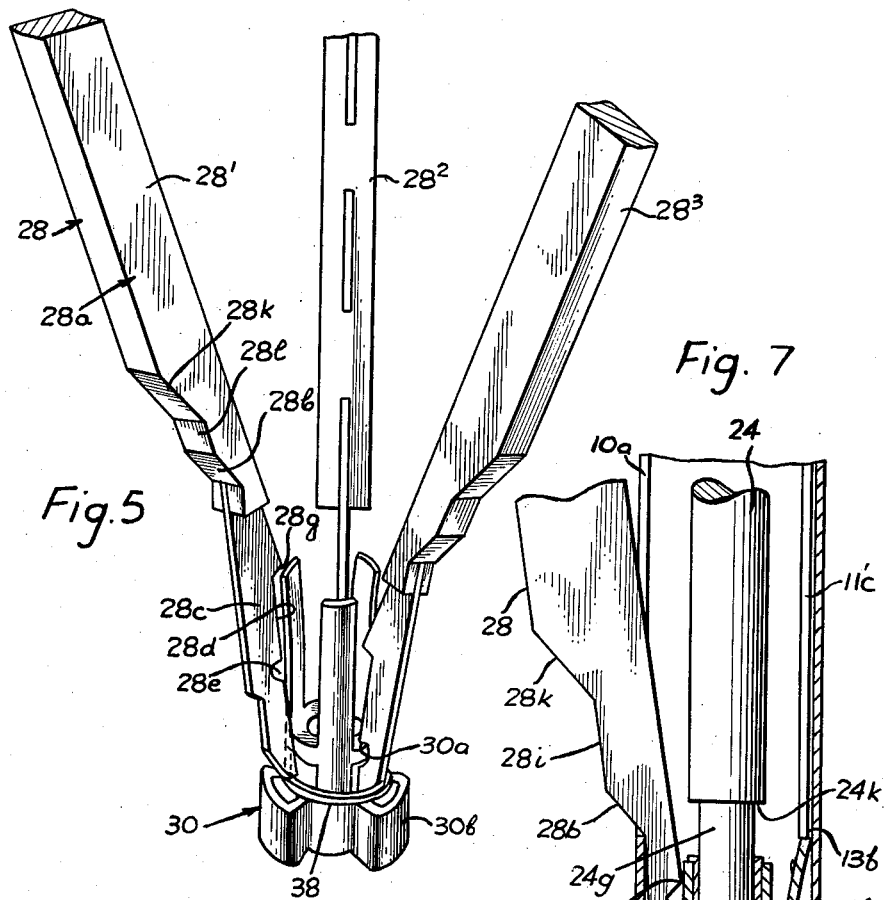
INVENTOR
HANS CHRISTIAN HANSEN
ATTORNEYS

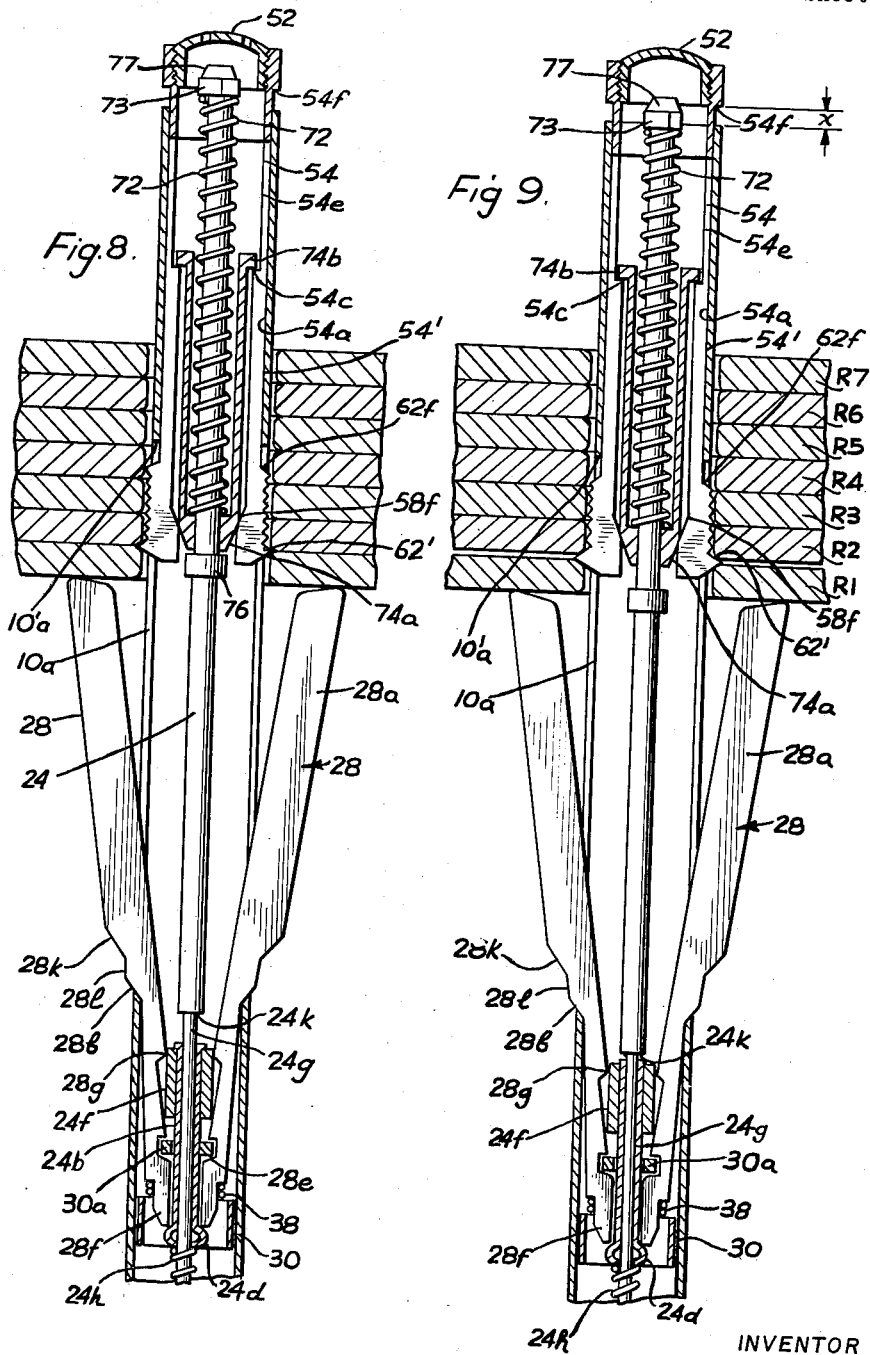

April 25, 1961

H. C. HANSEN 2,981,953

MAGAZINE PHONOGRAPHS

Filed March 5, 1957

10 Sheets-Sheet 6

INVENTOR.
HANS CHRISTIAN HANSEN

BY Dicke, Craig & Freudenberg
ATTORNEYS

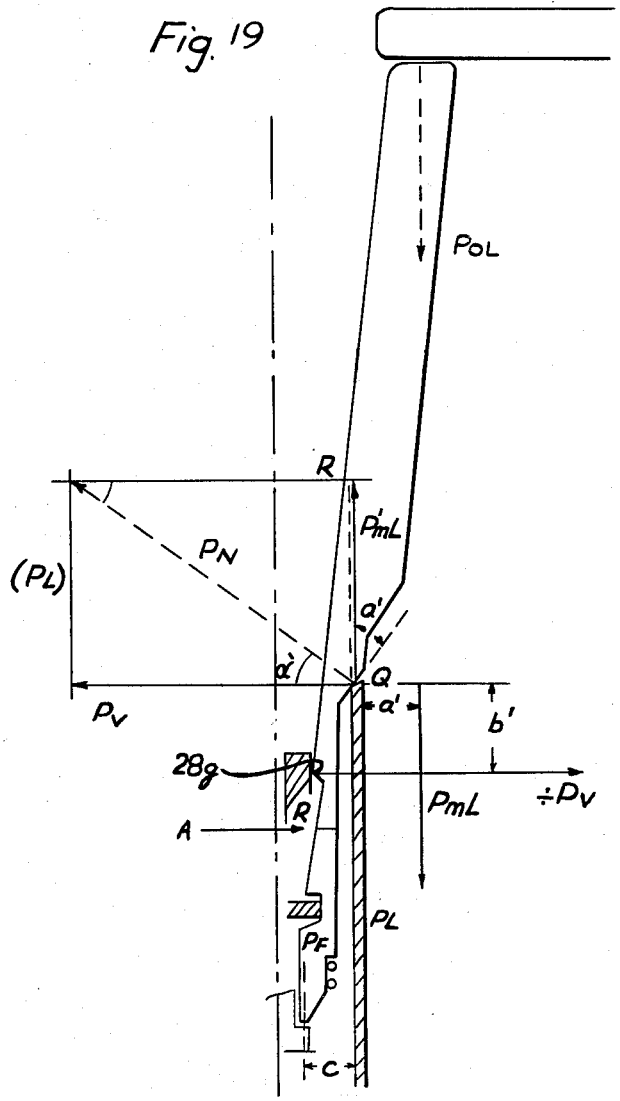

April 25, 1961 H. C. HANSEN 2,981,953
MAGAZINE PHONOGRAPHS
Filed March 5, 1957 10 Sheets-Sheet 8
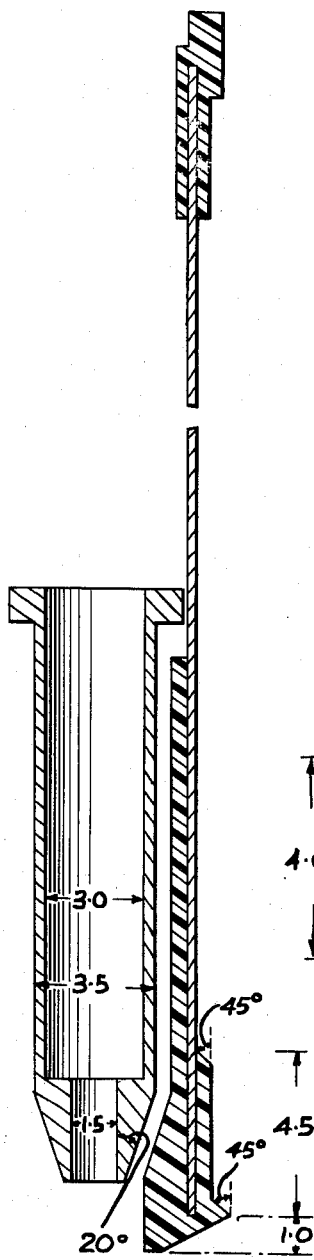
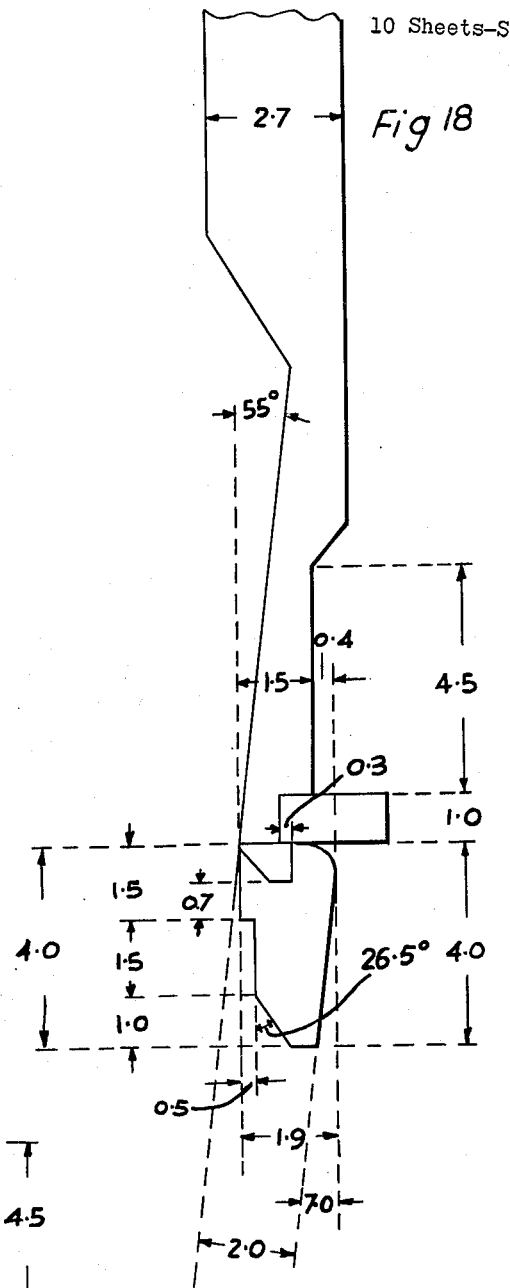
INVENTOR
HANS CHRISTIAN HANSEN
BY
ATTORNEYS

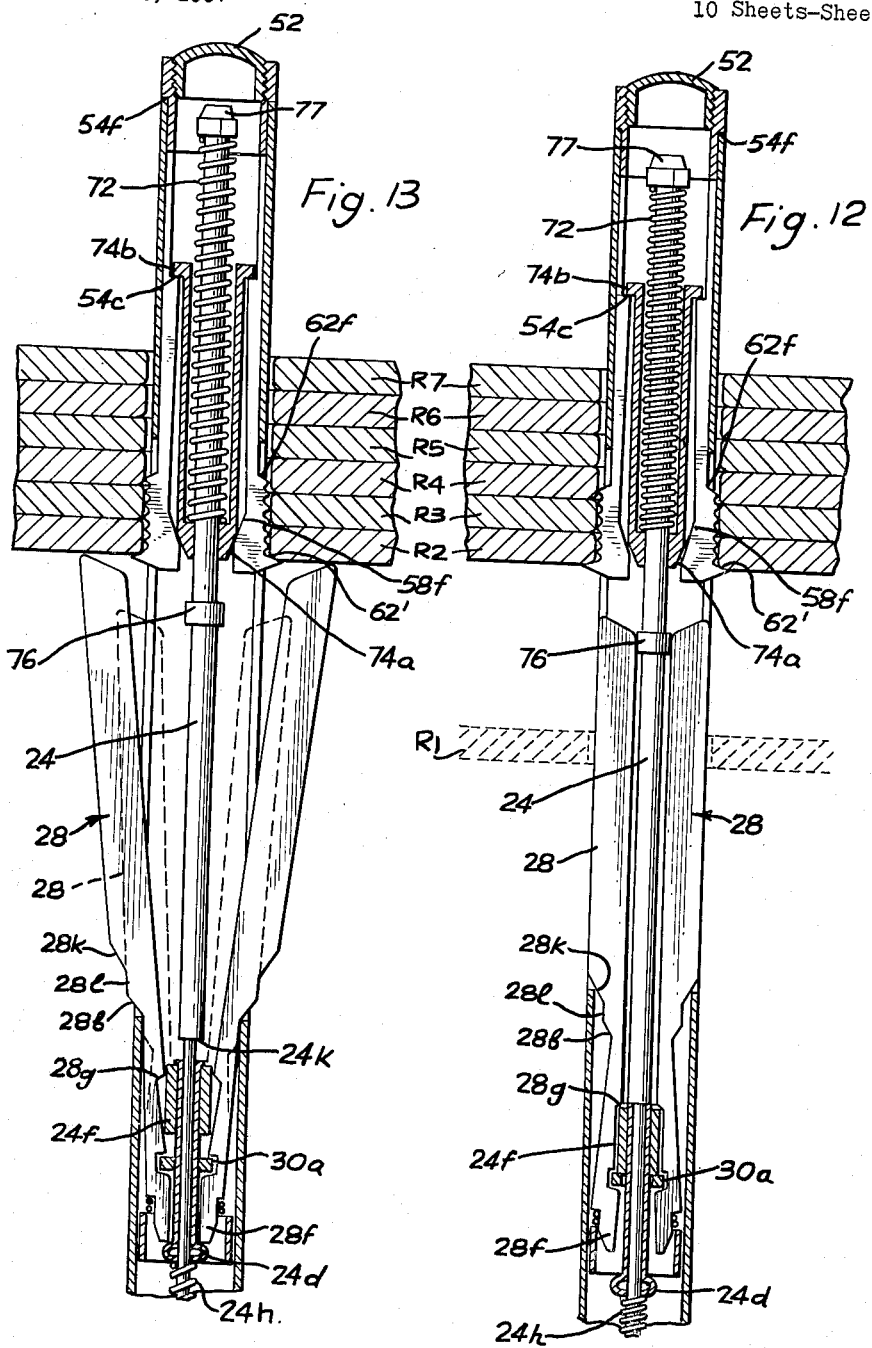

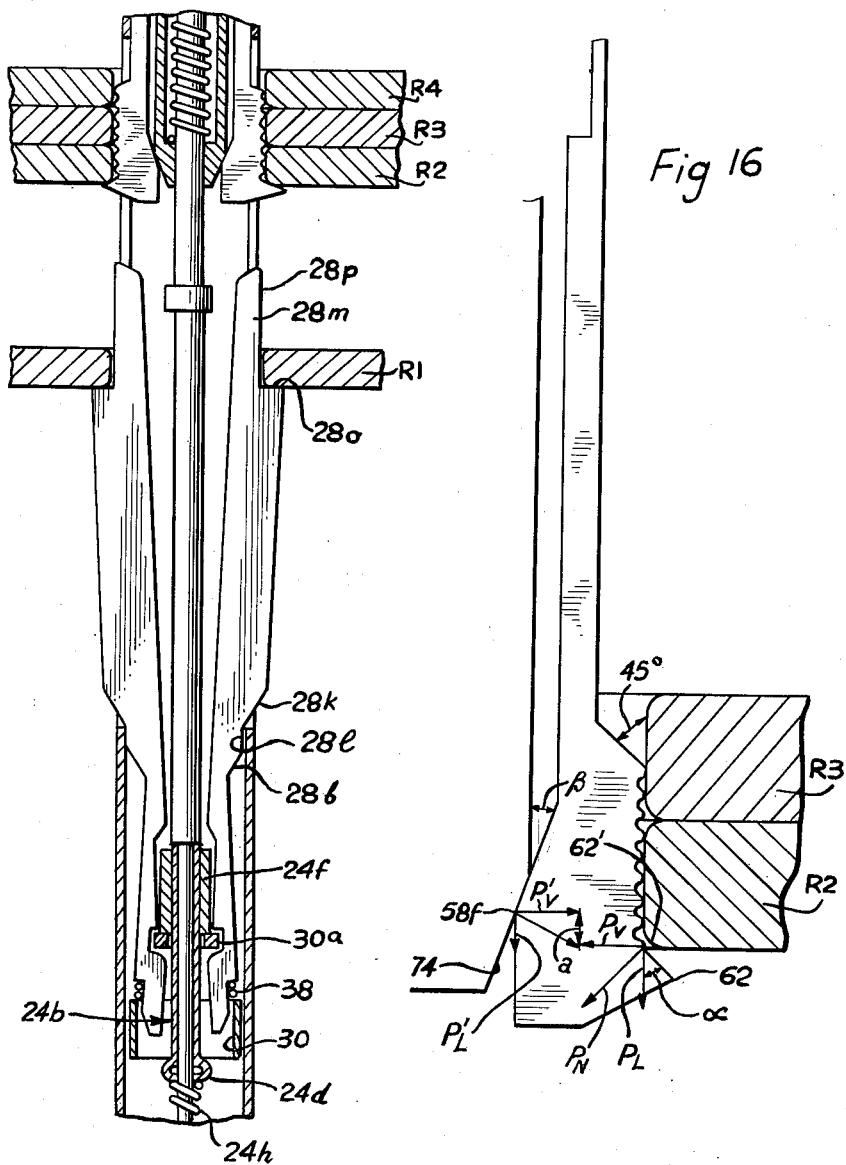

United States Patent Office 2,981,953
Patented Apr. 25, 1961

2,981,953

MAGAZINE PHONOGRAPHS

Hans Christian Hansen, 14 Christiansholmsvej, Copenhagen, Denmark

Filed Mar. 5, 1957, Ser. No. 644,119

Claims priority, application Great Britain Mar. 5, 1956

14 Claims. (Cl. 274—10)

This is a continuation-in-part application of my application Serial Number 602,884 filed August 8, 1956.

The invention relates to a center spindle for magazine phonographs and more particularly to a center spindle of the tubular type having a plurality of primary supporting prongs movable between an extending position to support a stack of records on their top ends and a retracted position allowing a record to descend along the spindle, and secondary supporting means for temporarily holding the remaining stack of records on the spindle, said secondary supporting means being actuable in such timed relationship with the movement of the primary supporting prongs that they are brought to their operative position before the primary prongs are moved to their retracted position and released to assume their inoperative position after the primary prongs have reassumed their operative position.

Spindles of this type have been described in various patent specifications. As examples reference is made to my U.S. Patent No. 2,604,425.

Also other inventors have tried to solve the problems of making a spindle of the type here referred to, which is satisfactory, see for example U.S. Patents 2,615,720 (Miller et al.), 2,689,735 (Morrison) and 2,579,175 (Dale).

The use of a spindle of this type in a magazine phonograph or record changing phonograph is attractive to the customers with respect to loading the phonograph with a stack of records because such a spindle does not require any stabilizer arm or over arm which has to be swung inwards to rest on the top of the stack of records. In order to load the spindle it is only necessary to place the stack of records on the spindle which, when the parts are in their normal position of rest, has the primary supporting members in their extending position.

In spite of this advantage and the need for such a spindle it has up till now not been possible to reduce any inventions relating to spindles to the type referred to to practice in such a manner that a spindle of this type has been designed which is easy to manufacture and safe in operation.

It is a purpose of the present invention to provide a spindle of the type referred to in which the majority of the parts is designed for being made on automatic machines.

It is a further purpose of the invention to provide a spindle of the type referred to which is easy to assemble and in which the necessary adjustment of the mutual positions of the parts can be made in a simple manner.

It is a further object of the invention to provide a spindle of the type referred to, which enables a gentle handling of the records so that for example a record can be dropped more than one thousand times without damaging the center hole.

It is a further object of the invention to provide a spindle of the type referred to which enables such a timed relationship between the movements of the secondary supporting members to their projecting position and movements of the primary supporting members to their retracted positions that the stack of records can be temporarily stabilized in a plane substantially perpendicular to the axis of the spindle.

It is a further purpose of the invention to provide a spindle having such a timed relationship between the movements of the parts mentioned hereinabove that the lowest record in the stack can be lowered relatively to the remaining part of the stack while the latter is supported by the secondary supporting members so as to give sufficient "air" between the lowest and the next lowest record to make sure that the lowest record does not remain "hanging" under the stack of records by vacuum or suction action.

It is a further object of the invention to provide a spindle of the type referred to, in which the primary supporting members can be lowered so much before they are retracted while the remaining portion of the stack is supported by the secondary supporting members that a feeler member, provided for measuring the size of the record and operative to sequentially set the control mechanism for moving the tone arm to respond to the size of the record measured, can be moved inwards to engage the edge of the record in such temporary lowered position without any critical adjustment of the horizontal plane in which said feeler member moves, and without the risk that it engages any other record than that which is temporarily lowered.

A more specific object is to provide a center spindle for use with a phonograph as disclosed in my copending U.S. patent application Ser. No. 633,288 filed January 9, 1957.

Still a further object of the invention is to provide a center spindle of the type referred to which is designed so as to prevent even a heavy load, for example a load of a stack of twelve 12″ records on the primary supporting members from moving these from their projecting to their retracted position.

Still a further purpose of the invention is to provide a spindle of the type referred to in which the forces acting on the secondary supporting members even in case of a heavy load, for example, ten or twelve 12″ records, will prevent the secondary supporting members from being moved inwards.

Still a further purpose of the invention is to provide a spindle of the type referred to in which the relative axial movement between the primary and the secondary supporting members is able to cause the supporting planes of said two members to be brought close together before the stack of records is released from the secondary supporting member so as to thereby avoid any substantial drop of the stack of records with resulting "shock" transmitted to the primary supporting members and through these to the control mechanism in the interior of the spindle.

With these and other objects which will appear from the following description in mind I provide a plurality of features.

Figure 1 is an exterior, perspective view of the spindle according to the invention, Figure 2 is a longitudinal section through an embodiment of a spindle according to the invention, which mainly differs from the embodiment shown in Figure 1 with respect to the supporting member for the primary prongs and which shows the parts in their mutual position of rest, Fig. 2a is a longitudinal section of the lower portion of the spindle shown in Fig. 1.

Figure 11:
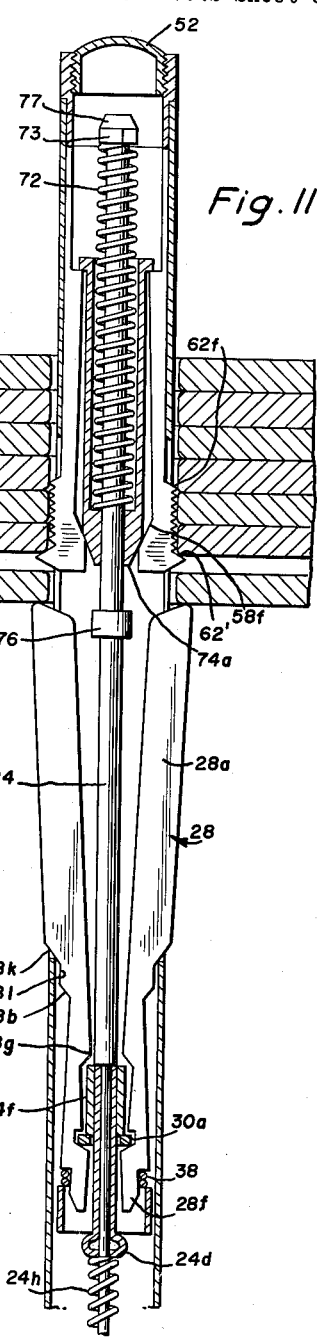

Figure 3 is an exploded view of the spindle shown in Figure 2, showing one of the primary prongs only, Figure 4 is an enlarged, perspective view of the supporting member for the primary prongs according to the embodiment shown in Figures 2 and 3, seen from the bottom and showing the lower end of one of the primary prongs, Figure 5 is a perspective view of the prong assembly, Figure 6 is a cross section through the exterior tube through the line A—A in Figure 2, Figure 7 is a part of a longitudinal section through the spindle according to the invention taken along the lines $B_1$—$B_2$ in Figure 6, Figure 8 is a longitudinal section through the upper part of the spindle according to the invention along the lines $B_1$—$B_3$ in Figure 6 with the parts in an intermediate position, Figure 9 is a similar longitudinal section with the parts in another position, Figure 10 is a similar longitudinal section with the parts in a further position, Figure 11 is a similar longitudinal section with the parts in still a further position, Figure 12 is a similar longitudinal section with the parts in still a further position which is that position in which the primary prongs are entirely retracted, Figure 13 is a similar longitudinal section illustrating the retraction of the secondary supporting members in two stages, Figure 14 is a longitudinal section through a part of the spindle with a modification of the primary prongs, Figure 15 is a similar longitudinal section through a part of the spindle showing still a further embodiment, Figure 16 is an enlarged section showing the dimensions of the lower ends of the secondary supporting members and the control member serving to bring these members into their operative position illustrating the distribution of forces, Figure 17 is an enlarged side view of the lower end of one of the primary supporting prongs showing the dimensions of the various parts, Figure 18 is an enlarged view of the lower end of one of the primary prongs showing the dimensions thereof, and Figure 19 is a diagram showing one of the primary prongs in a stationary position illustrating the distribution of forces due to a load on the top of the primary prong.

The spindle according to the invention is composed of the following parts:

The exterior part is a tubular structure including a tubular member 10 having a plurality of longitudinal slots 10a, 10b and 10c along a part of its length. The top edges of the longitudinal slots are referred to by 10'a, 10'b and 10'c, while the lower ends of the slots are referred to by 10''a, 10''b and 10''c. At the lower end of the tubular member there is provided a tube 12 of reduced diameter fitting inside the tube 10 and secured therein, e.g. by soldering, so that the lower end of the tube 10 forms a shoulder 10p by means of which the spindle can rest on the end of a hollow turntable centre bushing (not shown) through which the tube 12 extends.

A primary support generally designated by reference numeral 28 (Fig. 1) is provided for holding the stack of records in the form of a plurality of members such as prongs $28^1$, $28^2$ and $28^3$, which are tiltably arranged and able to extend through the slots 10a, or to be retracted to the interior of the spindle through said slots.

Each of these prongs generally referred to by 28 is in the embodiments shown moulded in a suitable synthetic resinous material which forms an upper body portion 28a.

Each prong has an interior reinforcement in the form of a steel blade or the like which at 28c extends below the body portion 28a. The main body portion 28a of each of the prongs 28 has at its lower end two inclined surfaces 28b and 28k spaced by a linear surface portion 28l. The lower blade-formed portion 28c is of reduced radial width compared with the body portion 28a. Somewhere below the inclined surface 28b the interior edge of each blade 28c has a corner or an abutment 28g below which the edge is cut away at 28d to provide passage and space for an abutment 24f on an interior control rod 24 which extends through the entire centre spindle and controls the retraction of the primary supporting prongs 28 as well as movement of secondary supporting members $62^1$, $62^2$ or $62^3$ which in the embodiments shown are in the form of knives or wedges.

Each of the lower portions 28c is further provided with a notch 28e extending from the interior edge 28d and as most clearly shown in Figures 4 and 5 designed to receive an annular portion 30a of a small bushing 30 the lower end of which has radial slots $30^1$, $30^2$ and $30^3$ to receive the lower ends of the members 28c and allow them to tilt. Furthermore, the bushing 30 is provided with a radially extending flange 30b in which the slots are provided. A spring 38 surrounds the lower ends of the members 28c and the exterior edge of each member is cut away at 28f to provide a portion of reduced width. This spring provides a resilient member which will serve to spread the blades by resiliently clamping their lower ends at 28f so as to cause them to tilt or pivot about the bearing defined by the annular portion 30a of the bushing 30 and the notches 28e and thereby spread the top ends of the prongs 28 to the position shown in Figures 1 and 2.

This part of the construction with the exception of the resinous covering on upper parts of the prongs as described hereinabove is shown in detail in my copending application Ser. No. 602,884 filed August 8, 1956, the disclosure of which is hereby made part of the disclosure of this application.

There is arranged in the top end of the spindle a member generally referred to by reference numeral 54 as shown in Figures 2 and 3. This member 54 comprises a cylindrical top portion 50 with interior screw threads to receive a plug 52 which defines a top closure member for the spindle and has an exterior diameter which substantially corresponds to the exterior diameter of the tube 10, so as to form an abutment limiting the downward movement of the member 54.

Rigidly secured to and extending downwards from the tubular top portion 50 there is provided a plurality of steel springs $54^1$, $54^2$ and $54^3$ or the like having such resiliency that when left alone they will spread slightly as shown in Figure 3. The lower end of each of said springs has as most clearly shown in Figure 2 a portion generally designated by reference numeral 58 with an inwardly extending portion defining an inclined surface 58f, and an outwardly extending portion which at its top end has an inclined surface 62f and which at its lower end communicates with the projecting knife member 62.

The top end of the interior control rod 24 is screw-threaded and provided with an adjustable nut or other suitable abutment as will be described more fully hereinafter against which the top end of a spring 72 bears. The other end of this spring bears against a slidable sleeve or bushing 74 the lower end of which is conically shaped at 74a with an inclination which substantially corresponds to the inclined surface 58f of the inwardly directed extension of the portion 58. The spring 72 presses the bushing 74 down against an abutment 76 rigidly secured to the control rod 24 above the abutment 24f. The lower tube 12 has an inwardly directed flange or the like formed in any suitable manner as will appear more fully hereinafter which forms an abutment for one end of a spring 82 the top end of which abuts against an abutment 78 secured on the rod 24 below the bushing 30.

The lower end of the interior control rod 24 is screw threaded at 84 and screwed in a screw-threaded hole in a cylindrical member 86 which has or effectively forms with another plug-like part an annular groove 88 adapted to cooperate with a control mechanism capable of pulling the control rod down.

The parts of the spindle are shown in more detail in the exploded view of Figure 3.

The main tube 10 is a standard tube in which the longitudinal slots 10a, 10b and 10c are made by stamping. By the stamping, narrow slots are cut in the longitudinal direction of the tube 10 and at each end of these narrow slots transverse cuts are provided corresponding to the desired width of each of the slots 10a, 10b and 10c.

The flaps provided in this manner are hereafter bent inwards so that the cross section of the tube will be as shown in Fig. 6.

As it will be clearly seen from Fig. 6 the longitudinal slots 10a, 10b and 10c have substantially the same width as the wall portions 11a, 11b and 11c between the slots, and these wall portions are each reinforced by the remaining material from the slots, which is bent inwardly to form flaps 11'a, 11"a, 11'b, 11"b and 11'c, 11"c respectively.

As will be seen from the part of the sections in Fig. 7 these inwardly bent flaps from abutments having downwardly facing shoulders of which the one seen in Fig. 7 is referred to by 13b.

In a preferred embodiment the lower tube 12 is a tube of a diameter slightly less than the interior diameter of the tube 10 and is along a part of its length expanded by means of a plunger or the like put down through the tube until a portion of it, for example along half of its length, has an exterior diameter which corresponds to the interior diameter of the tube 10. Hereby also a shouldered portion 15 is formed in the form of a conical interior surface, which has been found sufficient in practice to support the lower end of the spring 82.

The interior control rod 24 is made of steel wire and is at its lower end provided with the screw threads 84 for adjustably receiving the sleeve 86, which has a body portion 86a fitting in the lower end of the tube 12, so that it can slide therein, and a lower portion 86b of increased cross section and unround configuration so as to enable it to be rotated by means of a spanner or the like for the purpose of adjusting the top height to which the interior control rod 24 can be moved up.

The two abutments 76 and 78 are preferably provided in the material of the rod 24 itself by jolting or upsetting, and a top abutment 77 is preferably made in the same manner.

In the embodiment shown the abutment 24f adapted to cooperate with the small bushing 30 which supports the primary supporting prongs is rod generally designated by reference numeral 24b but in the form of a structure 24 comprising a sleeve 24c or the like which may be composed of two semi-cylindrical half portions which are held in position by means of a ring member 24f, which is clamped around the sleeve parts, and form the abutment. The sleeve structure 24b is slidably mounted on a portion 24g of the rod 24 of reduced diameter. The ring 24f is clamped so firm on the sleeve 24b, the top edge of which is bent outwards, that it will follow the movement of the sleeve along the portion 24g of reduced diameter. The lower end of the sleeve 24b has a portion 24d of increased diameter defining an upwardly facing shoulder forming an abutment against the lower ends of the primary prongs as shown in Figure 2. A spring 24h is interposed between the abutment 78 and the portion 24d and serves to push the sleeve structure 24b, 24f up to abut against a downwardly facing shoulder 24k of the control rod 24 above the portion 24g with reduced diameter unless upward movement of the sleeve structure is prevented in a manner which will be more fully described with reference to description of the mode of operation of the spindle.

The bushing 74 is in the form of a cylindrical sleeve 74a, which has an interior diameter so much larger than the diameter of the control rod 24 that it is capable of receiving the spring 72, the top end of which abuts against a washer 73, which is closed around the control rod 24 just below the abutment 77, and the bottom end of which abuts against a shoulder 74d in the interior of the cylindrical member 74a.

At the top end the cylindrical member 74a is provided with an outwardly extending collar 74b which is adapted to engage an upwardly facing shoulder 54c on the interior side of each of the spring fingers 54¹, 54² and 54³.

As shown in Figures 4, 5 and 6 the lower portion of the bushing 30 has three interior wall portions 30a', 30b' and 30c', which are defining a tubular member of an interior diameter which is sufficient to allow the bushing 30 to be placed over the interior rod 24 from the lower end thereof and pass over the abutment 78 as well as the spring 24h and the shoulder 24d. Between these wall portions the bushing 30 is provided with bulges or dents 31a, 31b, 31c, confining the radial slots 30¹, 30² and 30³ in which the lower ends of the primary prongs are received.

In alignment with the wall portions 30a', 30b' and 30c' there extend upwardly directed elastic fingers 33a, 33b and 33c, which above the bushing 30 are connected with the ring member 30a, which is received in the slots 28e of the primary supporting prongs. The fingers 33a, 33b and 33c extend outwardly above the ring 30a so as to enable them to engage the corresponding shoulders such as shoulder 13b (Fig. 7) below the flap pairs 11a, 11'a, 11b, 11'b and 11c, 11'c.

In the following the mode of operation of the spindle described will be explained:

In the position of rest the parts assume the relative position as shown in Fig. 2.

In this position the lower spring 82 the top end of which engages below the abutment 78 pushes the interior control rod upwards, until the movement is limited by the engagement between the lower end of the tube 12 and the top side 86c of the portion 86b of the bushing 86, which is screwed on the screw threads 84 at the lower end of the rod 24. It will thus be understood that the top position of the rod can be preset by adjusting the position of the member 86 on the lower end of the rod.

The spring 24h presses thereby the sleeve structure 24b upwards. By this upward movement the portion 24d engages the lower ends of the primary supporting prongs 28 and presses them up, while simultaneously the spring 38 serves to spread the prongs outwards like stretchers in an umbrella when their inclined exterior surfaces pass the lower edges of the longitudinal slots 10a, 10b and 10c in the tube 10.

The inwardly facing abutment surface or corner 28g is in this position slightly below the top of the ring member or abutment 24f, and prevents thereby an inward tilting of the prongs by engagement between the abutment surface 28g and the member 24f.

The upward movement of the bushing 30 is limited by engagement of the top end of the fingers 33a, 33b, 33c against the downwardly facing shoulders 13a, 13b, 13c formed at the lower ends of the inwardly bent flaps 11'a, 11"a, 11'b, 11"b, 11'c, 11"c as shown in the section in Fig. 7.

In the position of rest the control rod 24 is pushed so much that the downwardly facing shoulder 24k above the portion 24g of reduced diameter is vertically spaced from the sleeve structure 24b.

In the top position, the top of the abutment 76 abuts the lower end 74a of the member 74 and thereby defines the top position of this member. The length of the rod 24 above the abutment 76 is furthermore so adapted to the length of the structure 54 from the lower end of the inwardly extending inclined surfaces 58f to the bottom of the closure member 52 that the secondary supporting structure 54 is raised to its top position, because the top of the abutment 77 abuts against the underside of the closure member 52. This top position is as shown in Fig. 2 preset by adjustment of the member 86 on the lower end of the rod and the closure member 52 in the top end of the secondary supporting structure 50 in such a manner that the inclined surfaces 62f adjacent the exterior top of the portions 58 by engagement against the top edges of the longitudinal slots 10a 10b, 10c cause a retraction of the secondary wedge- or knife-formed members 58 to a position in which their edges are substantially in alignment with the periphery of the tubular member 10. This position of rest is also substantial so that the interior inclined edges 58f are substantially in alignment with the conical surface 74a and furthermore the outwardly extending annular flange 74b is in a position above the upwardly facing shoulders 54c of the spring members 54a.

When in this position of the spindle parts a stack of records $R_1$, $R_2$, $R_3$, $R_4$, $R_5$, $R_6$, $R_7$ is placed on the spindle, and the stack is supported on the top surfaces of the primary supporting prongs 28.

As it appears from the section in Fig. 2 the horizontal plane defined by the wedge members $62^1$, $62^2$, $62^3$ is in this position spaced more than the thickness of a record vertically above the plane defined by the top ends of the prongs $28^1$, $28^2$, $28^3$.

When thereafter the interior control rod is drawn downwards by means of a suitable control mechanism of the phonograph which has a portion engaging in the annular recess 88 in the lower end of the control rod, such as for example described in my copending application, Ser. No. 633,288 filed January 9, 1957, the disclosure of which is hereby made part of the disclosure of the present application, the movements and operations take place in the following sequence:

The lower face of top washer 73 below the abutment 77 will press on the top of the spring 72, which in its turn presses the cone structure 74 downwards. The conical surface 74a causes thereby the secondary supporting structure 54 to follow the downwardly directed movement. Since the secondary supporting structure is loosely arranged, the cone 74a will not cause any substantial outwardly directed force on the secondary supporting members as long as they are sliding downwardly and therefore practically no scratching will take place in the interior hole of the next lowest record $R_2$, because the only outwardly directed force is due to the slight outward bias caused by the leaf spring portions 54e. The tension of these springs is sufficient, however, to cause the wedge-formed members 62 to move sufficiently outwards in the interstice between the lowest and the next lowest record to stop the downward movement of the secondary supporting structure in the position shown in Fig. 8. In this position the further downward movement of the control rod 24 will bring the abutment 76 out of engagement with the lower end of the cone structure 74. Simultaneously the spring 72 will be further tensioned and cause the conical portion 74a to slide down along the interior inclined portions 58f of the secondary supporting members, until the annular portion 74b of the sleeve engages the upwardly facing shoulders 54c on the interior of the springs $54^1$, $54^2$ and $54^3$ in which position the further downward movement of the structure 74 relatively to the secondary supporting structure is prevented. The axial distance between the top end of the conical portion 74a and the lower face of the portion 74b is smaller than the axial distance between the lowest point of the inclined portion 58f and the shoulder 54c so as to prevent the cone structure 74 from being moved so far down that the top of the cone passes the lower end of the inclined surfaces in order to avoid the risk that the secondary supporting structure, when loaded with a heavy stack of records, might be hanging on the cylinder 74 and follow up with the member 74.

In the position shown in Fig. 8 the shoulder 24k has not yet reached the top end of the structure 24b. When the rod 24 is pulled slightly further downwards it reaches the position shown in Fig. 9, which differs from the position shown in Fig. 8 only thereby that it shows the spring 72 slightly more tensioned, the abutment 76 further lowered relatively to the cone structure 74 and the surface 24k near the position where it will engage the top of the structure 24b.

In this position the spring 72 does not only serve to press the secondary supporting members outwards to press the wedge members $62^1$, $62^2$, $63^3$ into the interstice between the records $R_1$ and $R_2$ and the exterior surfaces thereof against the walls of the holes in the records $R_2$ and $R_3$ thereabove but also to press the secondary supporting members downwards due to the forces acting between the cone 74a and the surfaces 58f. This pressure is transmitted to the primary supporting prongs, but due to the engagement between the abutment 28g and the ring member 24f as well as the angle between the lowest inclined portion 28b of the exterior surface of the prongs, the prongs cannot be pressed downwards so that the pressure exerted by the spring 72 will cause the stack of records to be stabilized safely in the plane perpendicular to the axis of the spindle, such as described in my copending application Ser. No. 633,288 filed January 9, 1957, referred to hereinabove.

At the stage of movements shown in Fig. 10 the control rod 24 is pulled so much further down that the downwardly facing shoulder 24k abuts against the top of the sleeve structure 24b and thereby presses this structure down, so that the inwardly facing abutments 28g are relieved from their engagement against the ring member 24f. At all the stages between the position shown in Figures 2 and 8–10 the sleeve structure 24b has been retained in the same relative position to the exterior tube due to the engagement between the lower ends of the primary prongs and the portion 24d as well as the frictional engagement between the surfaces 28g and the ring member 24f. Thus the narrow portion 24g of the rod 24 slides down through the sleeve structure 24b until the shoulder 24k abuts against the top of the sleeve structure 24b. Hereafter the sleeve structure must follow the further downward movement of the control rod 24. The first part of this movement is from the stage shown in Figure 9 to the stage shown in Figure 10, which causes such a downward movement of the secondary supporting structure as well as the primary supporting structure that the downwardly facing shoulder 54f on the top closure member 52 of the secondary structure abuts against the top end of the tube 10 and the primary prongs are moved slightly down caused by the fact that they are pressed down by the engagement between the ring 24f and the ring 30a of the bushing structure 30, so that the lower inclined surfaces 28b slide along the lower edges of the slots 10a, which causes the primary prongs to be retracted to an intermediate stage as shown in Fig. 10. During this movement the entire stack of records is lowered the distance x as shown in Figure 9, whereafter the records $R_2$–$R_7$ are kept in this lowered level.

During the further downward movement of the control rod 24 the bushing structure 30 is pressed further down with the result that the primary prongs $28^1$, $28^2$, $28^3$ are lowered while retained in the intermediate, retracted position to which they were brought in Fig. 10, while the linear prong portions 28l slide within the tubular member 10 passing the lower edges of the slots 10a, until the lower edge of the upper inclined portion 28k engages the lower end of the slots 10a, see Figure 11. The lowest record $R_1$ is thereby lowered relatively to the remaining part of the stack, so that sufficient space is provided to prevent this record from "hanging" under the remaining stack, or alternatively as described in my copending application Ser. No. 633,288 referred to hereabove enable the tone arm to be moved into engagement with the edge of the record without obstruction by the remaining stack. The primary prongs are thereafter entirely retracted which takes place during the further movement shown terminating in Fig. 12, where the inclined surfaces 28k have brought the prongs to their interior retracted position. At this stage the lowest record R₁ is dropped to the playing position on the turntable.

When thereafter the interior control rod 24 is allowed to be raised, the secondary supporting structure is still retained at the lowest level thereof as shown in Fig. 10, while the primary supporting prongs are following up and swung out first through the stage shown in dotted lines in Fig. 16 to the stage shown in full lines in Fig. 13, where as shown in Fig. 7 the top of the fingers 33a, 33b, 33c, abut against the downwardly facing shoulders 13a, 13b, 13c adjacent the lower ends of the foldings 11'a, 11'b, 11'c, etc. of the material of the rod 10 between the slots 10a, 10b, 10c. Hereafter a further upwardly directed movement of the sleeve structure 24b is prevented. The prongs are then in the position shown in full lines. This position is reached before the abutment 76 engages against the underside of the cone structure 74, and the parts are so designed that the tops of the primary prongs in this position are brought up near the underside of the record R₂. When the top of the abutment 76 engages the cone structure 74 it will press the cone structure upwards against the action of the spring 72 with the result that the weight of the remaining stack of records will press the secondary supporting members inwards so that the remaining stack is relieved from the secondary supporting members. Due to the close proximity between the top faces of the primary prongs and the stack of records at this stage of the movements, the support of the stack of records is gently taken over by the primary prongs without any drop, which otherwise might cause a shock transmitted down through the primary prongs to the control mechanism.

A further upward movement will then bring the different parts back to the position shown in Fig. 2 by the action of the spring 82 which presses the entire control rod 24 upwards to that position in which the shoulder 24k is spaced from the top of the sleeve structure 24b which is kept in position by the spring 24h, and which by means of the ring 24d presses the bushing member 30 with the end of its fingers against the abutments in the interior of the tube.

The modification shown in Fig. 14 differs from the modification shown in Figs. 2–13 thereby that the vertical portion 28l at the exterior surface of the prong 28 between the two inclined surfaces 28b and 28k is of increased vertical extension so that the lowering of the primary prongs between positions shown in Figs. 9 and 11 will cause the lowest record to be lowered substantially below the remaining stack of the records.

This has the advantage that it facilitates the above mentioned use of an inwardly swinging feeler member to engage the edge of the lowest record at this stage of movements for the purpose of measuring the size of the record and sequentially cause the movements of the tone arm to respond to the size of records so as to be landed correctly with its stylus in the initial groove after the record has been dropped to the playing position on the turntable.

I have found that by means of the inoperative idle stroke of the movement of the interior control rod 24 it is possible to lower the record until about half an inch below the remaining stack of records which is sufficient to use a feeler arrangement of the type briefly referred to without the necessity of setting the horizontal plane in which the feeler member swings to any critical height.

In order to provide for a stabilization of the lowest record supported in the position shown in Fig. 14 in the horizontal plane thereof, the tubular member 10 may as shown in the right hand half part of the section have narrow slots in the ribs 11a, 11b, 11c between the longitudinal slots in the tubular member for the passage of outwardly extending abutments against the underside of which the records can be pressed slightly upwards.

In the embodiment shown in the section Fig. 14, one of the narrow longitudinal slots is designated by reference numeral 13. In the space between the exterior wall portion 11a of the tube 10 and the inwardly bent flaps, a spring 17 is arranged. This spring may be held in position by having its top and bottom end bent like a hair-pin with the bent portion extending laterally in the space between the exterior wall and the inwardly bent flaps. The majority of the length of the spring 17 is arranged in alignment with the slot between the inwardly bent flaps. Further the spring 17 has in alignment with the slot an outwardly bent portion generally designated by 17a formed by a horizontal portion 17b, an inclined portion 17c, and a horizontal portion 17d. The spring is so soft that the weight of a record of the smallest weight to be handled will be able to press the outwardly bent portion 17a inwardly, so as shown in dotted lines, when the prongs are moved downwards. The prongs are then moved so far down that the record has passed below the horizontal portion 17d of the spring 17; the control mechanism for controlling the movements of the interior control rod 24 is so designed as to thereafter move the prongs 28 slightly upwards so as to engage the top side of the record R₁ against the underside of the horizontal spring portion 17d which operates as a latch and causes the record to be stabilized in the horizontal plane thereof.

It will be understood that this modification which forms a second stabilizing arrangement is only shown as an example, and that within the scope of the invention it will be possible to provide tiny spring-loaded latches or the like extending through slots like the slot 13.

Another modification of the spindle according to the invention which enables the record to be lowered and temporarily retained in a position lowered substantially relatively to the stack of records supported on the secondary supporting structure is shown in Fig. 15.

In this embodiment the exterior surface of the primary prong is cut away at 28p along a part of the length of the prong, so as to provide a portion 28m of reduced radial width and an upwardly facing shoulder 28o. The radian dimension of the portion 28m of reduced width is so adapted to the partly retracted position shown that the exterior wall along the cut away portion 28p in this position substantially aligns with the periphery of the spindle so that the record will slide down along the top portions of the prongs in their intermediate retracted position until it rests on the shoulders 28o.

This embodiment does not require any linear portion like 28l according to the embodiment described with reference to Figures 2–13. It will be sufficient to design the control mechanism of the phonograph which pulls the control rod 24 downwards, to stop the downward movement temporarily in the partly retracted position of the prongs shown in Fig. 15.

The control mechanism is further preferably so designed that after the temporary stop in this position, the control rod 24 is very slightly raised so as to cause the prongs to spread slightly outwards, which will result in a safe clamping of the record at this intermediate stage of its drop with stabilization in this horizontal plane.

It will be appreciated that a common feature of the embodiments shown is that each of the prongs is provided with a portion which enables a temporary lowered position of the lowest record supported on the prongs when they are in a position between their most spread position and their most retracted position.

It will be appreciated that an important feature of the invention is the dimensions of the portions 58 of the secondary supporting members and the steepness of the cone. In practice it is not possible to give the knife members a radial extension of substantially more than about 1.0 millimetre. Since such tiny wedges must be rigid enough not to be broken when loaded with a heavy stack of records which may weigh up to six lbs., they must have a certain thickness which gives a certain limitation with respect to how sharp the wedge can be made. It will be understood that if the wedges were made like knives, less force would be necessary to press them out in the interstice between the lowest and the next lowest record, but in such event there would be a substantial risk that they would break under the load of the stack of records.

Another thing which must be taken into consideration is that in the stationary position, when a whole stack of records is supported on the extending wedges, the reaction from the cone 74a must compensate for the inwardly directed component of the force acting on the wedge members in such a manner that tilting of the wedge members is prevented under influence of the load because otherwise the whole stack will be dropped.

The forces as distributed when the wedge members are stationary in their exterior supporting position loaded by a stack of records is illustrated in Fig. 16.

The top of the wedge member is influenced by a vertical force $P_L$ due to the weight of the stack of records. Looking apart from the friction between the parts, the resulting force ($P_N$) acting on the inclined surface must be substantially perpendicular to this surface, and $P_L$ must be the vertical component of this force ($P_N$) when resolved into the components in the vertical and horizontal directions. The corresponding horizontal component is found to be the inwardly directed force shown as $P_V$. Since the condition is supposed to be stationary and still without taking the friction in consideration the corresponding horizontal component $P'_V$ of the reaction from the cone will be given and must be equal to $P_V$ acting in the opposite direction thereof. When the angle $\beta$ between the cone and vertical direction and the corresponding angle $\alpha$ between the inclined surface of the wedge and the vertical direction are given, the downwardly directed force which is necessary to retain equilibrium i.e. the force of the spring 72 is found as $$P'_L = P'_V \cdot tg\beta$$

Furthermore $$P_V = P_L \cdot \cot\alpha \qquad (2)$$

Since, as mentioned above, $P'_V = P_V$ the following condition is found:

$$P'_L = P_L \cdot \cot\alpha \cdot tg\beta$$

Since the necessary thickness of the wedge member 62 in practice limits the angle $\alpha$ the practical way to reduce the necessary force to retain equilibrium is to make $\beta$ as small as possible.

In practice I have found that a suitable inclination of the wedges is 45° and that a suitable value of the angle $\beta$ is 20°.

As it furthermore will be seen from Fig. 16 the reaction component $P'_V$ which passes through the lowest point of the inclined surface 58f and the horizontal force $P_V$ which passes through the footpoint of the wedge member act in opposite directions in different horizontal planes spaced the distance $a$. This means that the two forces give rise to a tilting momentum with the arm $a$ trying to tilt the member in such a manner that the wedge member is moved inwards and the upper part of the member outwards against the action of the spring 54e, which thereby will be bent outwards to compensate the tilting moment. To avoid this and safeguard against tilting under the load of the stack of records, the footpoint of the inclined surface 58f should preferably be in the same horizontal plane as the footpoint of the wedge member 62 in which case the forces $P_V$ and $P'_V$ will counteract each other without giving rise to any tilting, which can be transmitted to the spring member 54e.

In Fig. 17 an example of the dimensions of the most important parts is given. The dimensions are in millimetres.

As furthermore indicated in Fig. 17, the ring member 50 at the top of the secondary supporting structure as well as the parts 58 including the interior portions up to the shoulder 54c may be of a synthetic resinous material moulded around the top and bottom ends of steel springs 54e. This feature is of importance and saves a plurality of mechanical operations in connection with making the secondary supporting structure. When using synthetic resinous material I have found a preferred material to be nylon. In production I am making the secondary supporting structure by first moulding the parts 58 at the lower ends of the springs in one mould. Hereafter the necessary number of springs provided with the parts 58 are inserted with their ends extending into another mould in which the ring member is moulded.

As to the primary supporting prongs, an example of dimensions which are found suitable at the lower ends thereof is given in Fig. 18. The dimensions also here are in millimetres.

Also with respect to the primary supporting prongs the dimensioning of the various angles will be a compromise between the ideal conditions and the structural features necessary due to the narrow annular space between the interior of the tube 10 and the control rod 24.

An important feature of the invention is the means preventing inward tilting of the prongs under influence of the weight of the stack of records. The engagement between the corners 28g and the exterior of the ring member 24f can, however, give rise to wear of the ring member, especially during that part of the downward movement of the control rod during which the secondary supporting members are pressing the lowest record down against the top of the primary prongs.

The inclination of the inclined surface 28h can, however, within the scope of my invention be dimensioned so as to reduce the force transmitted to the point of engagement between the corner 28g and the ring member 24, when a pressure is exerted on the top of the prong, such as will be understood from the following considerations with reference to the diagram shown in Fig. 19 illustrating the distribution of the various forces. Also here the conditions are supposed to be stationary and no attention is paid to the friction forces or the tension of the spring 82.

The vertical force $P_{oL}$ due to the pressure on the top of the prongs may just as well be considered as applied along the same line in the horizontal plane through the lower edges 10"a of the slots 10a. Due to the inclined position of the prongs this force is applied a distance $a'$ outside the point where the reaction $P'_{mL}$ is applied at the edge of the slot. The load and the reaction must be equal, i.e. $P_{mL} = P'_{mL}$, in as far as no other vertical forces are considered, and it will be seen that these forces will try to tilt the prong outwardly with the momentum $P_L \cdot a'$. The horizontal component of the resulting reaction $P_N$ acting on the inclined surface 28b perpendicular thereto and having the vertical component $P'_{mL}$ can be found as $P_V$. Since $P'_{mL} = P_{mL}$, it can be found that $$P_V = P_{mL} \cdot \cot\alpha' \qquad (1)$$

Since the condition is stationary, the reaction at the point 28g must be the same as the horizontal component $P_V$ with opposite direction. These two forces are spaced the distance $b'$, and are forming a momentum $P_V \cdot b'$ trying to tilt the system in an opposite direction of the momentum $P_L \cdot a'$.

In order to provide equilibrium, the condition is that $$a' \cdot P_L = b' \cdot P_V \qquad (2)$$

It is found thereby that the condition for equilibrium is $$b' = a' \cdot tg\alpha' \qquad (3)$$

Since the load does not appear in Formula (3) it will be understood that with the conditions specified it is theoretically possible to select the dimensions $a'$, $b'$ and the angle $\alpha$ so that any load can be supported on the prongs without any supporting springs.

Now the spring 82 is necessary for the function of the centre spindle in order to push the control rod 24 upwards after the record has been dropped. This spring causes a reduction of the reaction at the lower edge of the slots and adds a further pair of forces which will try to tilt the prongs outwardly with the arm $c$.

The conditions are further complicated, because the primary prongs are moved down and tilted inwardly, which changes the angle $\alpha$ as well as the arm $a'$.

By calculating further along the lines here indicated, it is possible to find ideal curve forms for the inclined portions 28b and 28k, but in view of the small dimensions and the accuracy with which such curves can be reproduced at such small dimensions, I have found that the dimensions shown in Fig. 18 give sufficient teaching to enable those skilled in the art to construct a spindle according to my invention, which is safe in operation and does not require any excessive pull of the control rod in order to retain a heavy stack of records on the secondary supporting structure as well as moving the primary prongs to their retracted position. With the dimensions given it is possible to construct a spindle which does not require substantially more than two lbs. pull for its operation.

The spindle according to the invention is assembled in the following manner, reference now being made to Fig. 3.

It is supposed that the exterior tubular structure is readily assembled from the two tubular members 10 and 12.

The secondary supporting structure is made as a separate assembly preferably with parts of it moulded in synthetic resinous material as described hereinabove.

A further sub-assembly is then formed by the interior control rod on which the structure 24b including the spring 24h is mounted around the portion 24g of reduced diameter and at the top end the cone structure 74 including the spring 72 and the abutment washer 73 is arranged.

Hereafter the bushing 30 is pushed on the rod from the lower end to a position in which the ring 30a abuts against the ring 24f, and thereafter the spring 82 is pushed over the lower end of the rod.

This sub-assembly is then put down through the tube 10 from the top end until the bushing structure 30 has reached a position slightly below the top end of the longitudinal slots.

Hereafter the secondary supporting structure 54 is put down passing over the top end of the control rod structure, and pressed down through the top portion of the tube 10 until the portions 58¹, 58², 58³ by the resiliency of the spring members 54e extend through the upper ends of the slots. This operation can be performed easily, because in this position the control rod structure has not yet passed so far down that the abutment 76 has reached the position inside the tube, so that there will be nothing which will prevent the downward movement of the secondary supporting structure.

Hereafter the control rod may be pushed further down, but only to a position in which the bushing structure 30 is still available through the slots. In this position the primary prongs are secured to the bushing by putting the lower ends 28f down in the slots or channels 30¹, 30² and 30³ of the bushing until the notch 28e aligns with the ring 30a, whereafter the prongs are pressed inwards and downwards which will keep them in safe engagement with the bushing and simultaneously push the control rod structure further down.

Hereafter the lower sleeve member 86 is screwed on the lower end of the control rod and the top closure cap 52 is secured in position. Hereafter only a test of correct function and adjustment of the member 86 as well as the cap 52 remains. These adjustments are made very easily bearing in mind that the mutual position of the parts must be that shown in Fig. 2.

While in the foregoing I have described my invention in great detail with reference to various possible embodiments it will be understood that these embodiments are illustrated and described as examples only and that still further modifications may be possible within the scope of the invention.

I claim:

1. In a phonograph record changer, a vertical hollow central guiding and supporting pin for a stack of records having a plurality of elongated slots, retractable primary supporting means in the form of prongs each of which has an upper body portion extending in the inclined position thereof upwards through one of said slots so as to define a supporting surface for a stack of records at its top end, secondary supporting means spaced above said primary supporting prong surfaces and operable to hold the next to the lowest record of said stack during release of the lowermost record of said stack, a control rod mounted for lengthwise sliding movement within said guiding pin, each of said prongs having a lower portion extending below said slot in the space between said guiding pin and said control rod, an annular member arranged for sliding movement within said pin, a connection between said lower end of each of the prongs and said annular member, means for exerting a downwardly directed pressure on said slidable annular member in response to downward movement of said control rod, two inclined surfaces at the exterior side of the upper body portion of each of said prongs adjacent the lower end of said body portion and each operable to slide along the lower edge of each of said slots to retract said prongs into said guiding pin when a downwardly directed pressure is exerted on said slidable annular member to actuate said prongs for downward movement, means operable in response to movement of said control rod to render said secondary supporting means operable to hold said next to the lowest record, the lower of each of said inclined surfaces of said prong body portions having a radial extension causing a partial retraction of said prongs, means operable to support the lowest record in said stack in a plane substantially parallel with said stack but spaced therefrom below said stack when said prongs are in said partially retracted position, the upper one of each of said inclined surfaces having a radial extension sufficient to retract said prongs and to release said record supported in said position below said stack in response to further downward movement of said slidable member.

2. In a phonograph record changer, a vertical hollow central guiding and supporting spindle for a stack of records having a plurality of elongated slots, a plurality of primary supporting prongs each having a top end and movable between an upwardly inclined extending position operable to support a stack of records on said top ends and a retracted position allowing a record to descend along the spindle, secondary supporting means for temporarily holding the next to the lowermost record of a stack supported on said upwardly facing prong ends, means operable to control operation of said secondary supporting means in such timed relationship to the operation of said prongs that said secondary supporting means are actuated before retraction of said prongs into the guiding spindle and released to assume their inoperative position after said prongs have reassumed their operative position, said control means including a control rod mounted for lengthwise movement within said guiding spindle, means for moving said prongs downwards in response to downward movement of said control rod, means for transmitting said downward movement of said prongs to cause a retraction of said prongs to a first position, means operable to support the lowest record of said stack of records axially displaced below the remaining part of said stack in said first position of said prongs in a plane substantially parallel with the remaining part of said stack, and means operable to transmit a further downward movement of said control rod to retract said primary prongs to within the confines of said guiding spindle to release said record to descend along said pin.

3. In a phonograph record changer, a vertical hollow central guiding and supporting pin for a stack of records having a plurality of elongated slots, retractable primary supporting means in the form of prongs each of which has an upper bory portion extending in the inclined position thereof upwards through one of said slots so as to define a supporting surface for a stack of records at its top end, secondary supporting means spaced above said primary supporting prong surfaces and operable to hold the next to the lowest record of said stack during release of the lowermost record of said stack, a control rod mounted for lengthwise sliding movement within said guiding pin, each of said prongs having a lower portion extending below said slot in the space between said guiding pin and said control rod, an annular member arranged for sliding movement within said pin, a connection between said lower end of each of said prongs and said annular member, means for exerting a downwardly directed pressure on said slidable annular member in response to downward movement of said control rod, two inclined surfaces at the exterior side of upper body portion of each of said prongs adjacent the lower end of said body portion spaced by an exterior substantially linear surface portion and each operable to slide along the lower edge of each of said slots to retract said prongs into said guiding pin when a downwardly directed pressure is exerted on said slidable annular member to actuate said prongs for downward movement, means operable in response to movement of said control rod to hold said next-lowest record, the lower of each of said inclined surfaces of said prong body portions having a radial extension causing a partial retraction of said prongs, said linear surface portions of said prongs being of such an extension that said prongs are moved aixally in said partially retracted position to cause axial displacement of said lowest record supported on the top ends of said prongs to assume a position in a plane substantially parallel with said stack but spaced therefrom below said stack, the upper one of each of said inclined surfaces having a radial extension sufficient to retract said prongs and to release said record supported in said position below said stack in response to further downward movement of said slidable member.

4. In a phonograph record changer, a vertical hollow central guiding and supporting pin for a stack of records having a plurality of elongated slots, a plurality of primary supporting prongs each having a top end and movable between an upwardly inclined extending position operable to support a stack of records on said top ends and a retracted position allowing a record to descend along the guiding pin, secondary supporting means for temporarily holding the next to the lowest record of a stack supported on said upwardly facing prong ends, means operable to control operation of said secondary supporting means in such timed relationship to the operation of said prongs that said secondary supporting means are actuated before retraction of said prongs into the guiding pin and released to assume their inoperative position after said prongs have reassumed their operative position, said control means including a control rod mounted for lengthwise movement within said guiding pin, means for moving said extending prongs downwards with the lowest record of said stack supported on their top ends in response to downward movement of said control rod to support said lowest record axially displaced below the remaining stack of records in a lower plane substantially parallel with the remaining stack of records, latch members extending outside said guiding pin between the plane of said next to the lowest record and said lower plane mounted for resilient movement into said pin operable by the passage of said lowermost record and operable to prevent upward movement of said record after downward passage thereof, and means operable to transmit a further downward movement of said control rod to retract said primary prongs to within the confines of said guiding pin to release said record to descend along said guiding pin.

5. In a phonograph record changer, a vertical hollow central guiding and supporting pin for a stack of records having a plurality of elongated slots, a plurality of primary supporting prongs each having a top end and movable between an upwardly inclined extending position operable to support a stack of records on their top ends and a retracted position allowing a record to descend along the guiding pin, secondary supporting means for temporarily holding the next to the lowest record of a stack supported on said upwardly facing prong ends, means operable to control operation of said secondary supporting means in such timed relation to the operation of said prongs that said secondary supporting means are actuated before retraction of said prongs into the guiding pin and released to assume their inoperative position after said prongs have reassumed their operative position, said control means including a control rod mounted for reciprocation through a predetermined stroke within said guiding pin, means for lowering said exterior prongs downwards in response to a downward stroke of said control rod to support the lowest record in said stack of records axially displaced below the remaining stack of records in a plane substantially parallel with the remaining stack of records, resilient means extending outside the confines of said guiding pin and having portions defining downwardly facing abutment means operable to allow downward passage of said record to said lower plane, said downwardly facing abutment means being operable to prevent upward movement of said record from said lower plane, means for reversing the stroke of said control rod to bring said record into engagement with said downwardly facing abutment means whereby said record is stabilized in the plane of said abutment means, and means thereafter operable to continue the downward stroke of said control rod to retract said primary prongs to within the confines of said guiding pin to release said record to descend along said pin.

6. In a phonograph record changer, a vertical hollow central guiding and supporting pin for a stack of records having a plurality of elongated slots, a plurality of primary supporting prongs each having a top end, a portion of reduced radial extension and an upwardly facing shoulder below said top end and being movable between an upwardly inclined extending position operable to support a stack of records on their top ends and a retracted position allowing a record to descend along the guide pin, secondary supporting means for temporarily holding the next to the lowermost record of a stack supported on said upwardly facing prong ends, means operable to control operation of said secondary supporting means in such timed relationship to the operation of said prongs that said secondary supporting means are actuated before retraction of said prongs into the guiding pin and released to assume their inoperative position after said prongs have reassumed their operative position, said control means including a control rod mounted for reciprocation with a predetermined stroke within said guiding pin, means for partly retracting said prongs in response to a part of the stroke of said control rod to a first position with the exterior surface of the top portion of each of said prongs substantially in alignment with the confines of said guiding pin, whereby the lowest record will be supported on said upwardly facing shoulders of said prongs in a plane below the remaining part of said stack, and means thereafter operable to continue the stroke of said control rod to retract said primary prongs to within the confines of said guiding pin to release said record to descend along said pin.

7. In a phonograph record changer, a vertical hollow central guiding and supporting pin for a stack of records having a plurality of elongated slots, a plurality of primary supporting prongs each having a top end, a portion of reduced radial extension and an upwardly facing shoulder below said top end and being movable between an upwardly inclined extending position operable to support a stack of records on their top ends and a retracted position allowing a record to descend along the guiding pin, secondary supporting means for temporarily holding the next to the lowermost record of a stack supported on said upwardly facing prong ends, means operable to control operation of said secondary supporting means in such timed relationship to the operation of said prongs that said secondary supporting means are actuated before retraction of said prongs into the guiding pin and released to assume their inoperative position after said prongs have reassumed their operative position, said control means including a control rod mounted for reciprocation with a predetermined stroke within said guiding pin, means for partly retracting said prongs in response to a part of the stroke of said control rod to a first position with the exterior surface of the top portion of each of said prongs substantially in alignment with the confines of said guiding pin, whereby the lowest record will be supported on said upwardly facing shoulders of said prongs in a plane below the remaining part of said stack, means for reversing the direction of the stroke of said control rod to engage the exterior surfaces of said portions of reduced radial extension with the center hole of the record supported on said shoulders, whereby the record will be stabilized in said lower plane, and means thereafter operable to continue the stroke of said control rod in a direction to retract said primary prongs to within the confines of said guiding pin to release said record to descend along said pin.

8. In a phonograph record changer, a vertical hollow central guiding and supporting pin for a stack of records having a plurality of elongated slots, a plurality of primary supporting prongs each provided with a body portion having a top end and with a lower outwardly facing inclined cam surface, each prong being movable in one of said slots between an upwardly inclined extending position operable to support a stack of records on their top ends with said lower inclined cam surface operatively engaging the lower end of said slot to prevent tilting of said prong under the influence of the weight of said stack of records, and a retracted position allowing a record to descend along the guiding pin, a secondary supporting means for temporarily holding the next to the lowest record of a stack supported on said upwardly facing prong ends, a reciprocable control rod operable to control operation of said secondary supporting means in such timed relationship to the operation of said prongs that said secondary supporting means are actuated before retraction of said prongs into the guiding pin and released to assume their inoperative position after said prongs have reassumed their operative position, outwardly facing surfaces 281 provided on said prong bodies extending substantially in vertical direction and operable to allow said prongs to be lowered in response to reciprocation of said control rod into a position with the top ends of each of said prongs substantially below said secondary supporting means, whereby the lowest record will be supported on said prongs in a plane below the remaining part of said stack, and further cam surfaces on said prong bodies above said substantially vertically extending surfaces operable in response to further reciprocation of said control rod to retract said primary prongs to within the confines of said guiding pin to release said record to descend along said pin.

9. In a phonograph record changer, a vertical hollow central guiding and supporting pin for a stack of records having a plurality of elongated slots, a plurality of primary supporting prongs each having a body portion provided with a top end and each being movable in one of said slots between an upwardly inclined extending position operable to support a stack of records on their top ends and a retracted position allowing a record to descend along the guide pin, secondary supporting means for temporarily holding the next to the lowest record of a stack supported on said upwardly facing prong ends, a reciprocable control rod operable to control operation of said secondary supporting means in such timed relationship to the operation of said prongs that said secondary supporting means are actuated before retraction of said prongs into the guiding pin and released to assume their inoperative position after said prongs have reassumed their operative position, an abutment on said control rod, an inwardly directed abutment surface on each of said prongs operable to engage said abutment on said control rod to prevent inward tilting of said prongs under the influence of the weight of said stack of records, outwardly facing surfaces provided on said prong bodies extending substantially in the vertical direction and operable to allow said prongs to be lowered in response to reciprocation of said control rod into a position with the top ends of each of said prongs substantially below said secondary supporting means, whereby the lowest record will be supported on said prongs in a plane below the remaining part of said stack, and cam surfaces on said prong bodies above said substantially vertically extending surfaces operable in response to further reciprocation of said control rod to retract said primary prongs to within the confines of said guiding pin to release said record to descend along said pin.

10. In a phonograph record changer, a vertical hollow central guiding and supporting pin for a stack of records having a plurality of elongated slots, a plurality of primary supporting prongs each having a body portion provided with a top end and with an outwardly facing inclined cam surface and being movable in one of said slots between an upwardly inclined extending position operable to support a stack of records on their top ends and a retracted position allowing a record to descend along the guide pin, means operable to prevent tilting of said prongs under the influence of the weight of said stack of records, secondary supporting means for temporarily holding the next to the lowest record of a stack supported on said upwardly facing prong ends, a reciprocable control rod operable to control operation of said secondary supporting means in such timed relationship to the operation of said prongs that said secondary supporting means are actuated before retraction of said prongs into the guiding pin and released to assume their inoperative position after said prongs have reassumed their operative position, outwardly facing surfaces provided on said prong bodies extending substantially in the vertical direction below said inclined surfaces and operable to allow said prongs to be lowered in response to reciprocation of said control rod into a position with the top ends of each of said prongs substantially below said secondary supporting means, whereby the lowest record will be supported on said prongs in a plane below the remaining part of said stack prior to the retraction of said primary prongs to within the confines of said guiding pin to release said record to descend along said pin.

11. In a phonograph record changer, a vertical hollow central guiding and supporting pin for a stack of records having a plurality of elongated slots, a plurality of primary supporting prongs each being movable in one of said slots between an upwardly inclined extending position operable to support a stack of records on their top ends and a retracted position allowing a record to descend along the guide pin, secondary supporting means for temporarily holding the next to the lowest record of a stack supported on said upwardly facing prong ends, control means operable to operate said prongs and said secondary supporting means in such timed relationship that said secondary supporting means are actuated before retraction of said prongs into the guiding pin and released to assume their inoperative position after said prongs have reassumed their operative position, means operable to lower said prongs in the extending position thereof to a position with the top ends of said prongs substantially below said secondary supporting means, whereby the lowest record will be supported on said prongs in a plane below the remaining part of said stack, cam surfaces provided on said prongs operable to retract said prongs to within the confines of said guiding pin to release said record to descend along said pin, and means operable to retain said prongs in inclined extending record-supporting position thereof until said cam surfaces are rendered effective to retract said prongs.

12. In a phonograph record changer, a vertical hollow central guiding and supporting pin for a stack of records having a plurality of elongated slots, a plurality of elongated supporting prongs each being movable in one of said slots between an operative record-supporting position extending upwardly in an inclined direction to support a stack of records on their top ends and a retracted position allowing a record to descend along the guide pin, means operable to lower said prongs into a position thereof with the top ends of each of said prongs substantially below said secondary supporting means, whereby the lowest record will be supported on said prongs in a plane below the remaining part of said stack, means operable in said lowered position only to retract said prongs to within the confines of said guiding pin to release said record to descend along said pin, means operable to retain said prongs in the extending operative position thereof until said retraction means is rendered effective, secondary supporting means for temporarily holding the next to the lowest record of a stack supported on said upwardly facing prong ends, and control means operable to render said secondary supporting means effective in such timed relationship to the operation of said prongs that said secondary supporting means are actuated before lowering of said prongs.

13. In a phonograph record changer, a vertical hollow central guiding and supporting pin for a stack of records having a plurality of elongated slots, elongated control means arranged for reciprocation within said pin, a plurality of primary supporting prongs each having an upper body portion extending in an inclined position upwards through each of said slots to define at their top ends a record support essentially perpendicular to the longitudinal direction of said pin, said prongs having at the lower ends of said upper body portions first inclined outwardly facing surfaces defining cam members operable to retract said prongs to within the confines of said pin in response to downward reciprocation of said prongs, said prongs further including below said cam surfaces, further portions having exterior surfaces of substantially vertical extension and below said further portions second inclined cam surfaces operable by engagement with the lower ends of said slots to prevent retraction of said prongs under the influence of the weight of a stack of records supported on the top ends of said prongs, and means operable to reciprocate said prongs in their inclined positions in response to reciprocation of said control means into a position with said first inclined surfaces substantially in alignment with the lower ends of said slots to lower the lowest record of a stack supported on the top ends of said inclined prongs below the remaining part of the stack, and secondary supporting means for temporarily holding the next to the lowest record of said stack during such reciprocation.

14. In a phonograph record changer, a vertical hollow central guiding and supporting pin for a stack of records having a plurality of elongated slots, elongated control means arranged for reciprocation within said pin, a plurality of primary supporting prongs each having an upper body portion extending in an inclined position upwards through each of said slots to define at their top ends a record support essentially perpendicular to the longitudinal direction of said pin, said prongs having at the lower ends of said upper portions inclined outwardly facing surfaces defining cam members operable to retract said prongs to within the confines of said pin in response to downward reciprocation of said prongs, means operable to prevent retraction of said prongs under the influence of the weight of a stack of records supported on the top ends of said prongs, and means operable to reciprocate said prongs in their inclined positions in response to reciprocation of said control means to lower the lowest record of a stack supported on the top ends of said inclined prongs below the remaining part of the stack, and secondary supporting means for temporarily holding the next to the lowest record of said stack during such reciprocation.

References Cited in the file of this patent
UNITED STATES PATENTS

| | | |
|---|---|---|
| 2,579,175 | Dale | Dec. 18, 1951 |
| 2,604,325 | Hansen | July 22, 1952 |
| 2,873,977 | Manning | Feb. 17, 1959 |